(12) United States Patent
Cable et al.

(10) Patent No.: US 7,534,519 B2
(45) Date of Patent: May 19, 2009

(54) SYMMETRICAL, BI-ELECTRODE SUPPORTED SOLID OXIDE FUEL CELL

(75) Inventors: Thomas L. Cable, Newbury, OH (US); Stephen W. Sofie, Bozeman, MT (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 535 days.

(21) Appl. No.: 11/228,185

(22) Filed: Sep. 16, 2005

(65) Prior Publication Data

US 2007/0065701 A1     Mar. 22, 2007

(51) Int. Cl.
*H01M 2/00*     (2006.01)
*H01M 8/10*     (2006.01)

(52) U.S. Cl. ............... 429/34; 429/30; 429/33
(58) Field of Classification Search ............ 429/30, 429/33, 34, 45; 427/115
See application file for complete search history.

(56) References Cited

U.S. PATENT DOCUMENTS

| | | | |
|---|---|---|---|
| 5,350,641 A | | 9/1994 | Mogensen et al. |
| 5,474,800 A | | 12/1995 | Matsuzaki |
| 5,543,239 A | | 8/1996 | Virkar et al. |
| 5,591,537 A | | 1/1997 | Bagger et al. |
| 5,670,270 A | | 9/1997 | Wallin |
| 5,937,264 A | | 8/1999 | Walline |
| 5,958,304 A | * | 9/1999 | Khandkar et al. ....... 252/519.15 |
| 5,993,986 A | * | 11/1999 | Wallin et al. ................. 429/32 |
| 6,017,647 A | * | 1/2000 | Wallin ......................... 429/33 |
| 6,402,156 B1 | * | 6/2002 | Schutz et al. ............... 277/316 |
| 2001/0053471 A1 | | 12/2001 | Gorte et al. |
| 2002/0081762 A1 | | 6/2002 | Jacobson et al. |
| 2003/0077504 A1 | | 4/2003 | Hara et al. |
| 2003/0118879 A1 | | 6/2003 | Barnett et al. |
| 2004/0033405 A1 | | 2/2004 | Barnett et al. |
| 2004/0043269 A1 | | 3/2004 | Taniguchi et al. |
| 2004/0068865 A1 | | 4/2004 | Lemmon et al. |
| 2005/0016839 A1 | * | 1/2005 | Horne et al. ................. 204/242 |
| 2005/0202306 A1 | * | 9/2005 | Zhang ......................... 429/40 |

OTHER PUBLICATIONS

Article by Eileen J. DeGuire, Apr. 2003, http://www.csa.com/hottopics/fuecel/overview.php Article by Moon, et al. Materials Letters 57 (2003) 1428-1434.
Article by Moon, et al. Materials Letters 57 (2003) 1428-1434. www.sciencedirect.com.

* cited by examiner

*Primary Examiner*—Patrick Ryan
*Assistant Examiner*—Muhammad Siddiquee
(74) *Attorney, Agent, or Firm*—Mark Homer (57) ABSTRACT

The present invention is a symmetrical bi-electrode supported solid oxide fuel cell comprising a sintered monolithic framework having graded pore electrode scaffolds that, upon treatment with metal solutions and heat subsequent to sintering, acquire respective anodic and cathodic catalytic activity. The invention is also a method for making such a solid oxide fuel cell. The graded pore structure of the graded pore electrode scaffolds in achieved by a novel freeze casting for YSZ tape.

21 Claims, 6 Drawing Sheets

SYMMETRICAL, BI-ELECTRODE SUPPORTED SOLID OXIDE FUEL CELL

STATEMENT REGARDING FEDERALLY SPONSORED RESEARCH OR DEVELOPMENT

The invention described herein was made by an employee of the United States Government and may be manufactured and used by or for the Government for Government purposes without the payment of any royalties thereon or therefore.

CROSS-REFERENCE TO RELATED APPLICATIONS

The present application relates to U.S. patent application Ser. No. 11/228,184 entitled MONOLITHIC SOLID OXIDE FUEL CELL STACK WITH SYMMETRICAL, BI-ELECTRODE SUPPORTED CELLS.

FIELD OF THE INVENTION

The present invention relates generally to fuel cells and more particularly to high power density solid-oxide fuel cells and the fabrication thereof.

BACKGROUND

Fuel cells consist essentially of two electrodes that are in contact with an electrolyte. For example, the electrolyte can be a water solution of an acid, such as phosphoric acid, or, as explained below, it can be a solid material such as a permeable metal oxide through which ions can migrate. In the case of a liquid electrolyte solution, two porous electrodes are immersed within it; through these electrodes, such reactants as hydrogen and oxygen are conveyed into contact with the electrolyte. The hydrogen and oxygen react to release ions and electrons, and water is produced. The electrons do useful work in an external circuit, whereas the ions flow through the electrolyte from one electrode to the other to complete the internal circuit in the cell.

Fuel cell technology is relatively old and well understood. (See, for example, a publication by NASA entitled, "Fuel Cells—A Survey", NASA SP-5115 published in 1973.) Every fuel cell consists of an electrolyte material which is sandwiched between two porous electrodes, an anode and a cathode. The input fuel passes through the anode wherein it is split into ions and electrons. The electrons are conducted through an external circuit while the ions move through the electrolyte toward the oppositely charged cathode. At the cathode, the ions combine with oxygen to form water and, depending on the fuel, carbon dioxide.

In most liquid-electrolyte fuel cells, platinum coats both the anode and cathode; the side of the electrode that is adjacent to the electrolyte serves as a catalyst for the oxidation and reduction processes. Fuel and oxidant gases are supplied to the back of the anode and the cathode respectively, and both the anode and cathode are electrically conductive.

Solid-oxide fuel cells employ a thin solid metal-oxide electrolyte through which oxygen ions can diffuse. A porous cathode electrode and a porous anode electrode are created during the fabrication process on opposite sides of the electrolyte.

Solid-state electrolytes can withstand the higher operating temperatures that correspond to greater specific power production from fuel cells. Fuel cells that use solid electrolytes are called ceramic fuel cells or, more specifically, solid-oxide fuel cells, because the electrolyte is a thin layer of solid metal oxide.

The majority of solid oxide fuel cell (SOFC) developers are pursuing a planar cell geometry with an anode supported cell design (ASC) with metal interconnects. The major challenges of the ASC technology relates to fabrication and reliability, particularly in regards to stacks of cells. A thin metal oxide electrolyte (such as yttria stabilized zirconia, or YSZ), on the order of 10-15 microns (um) thick, is supported on a thick cermet anode (500 to 1,000 um thick) composed of nickel oxide and yttria stabilized zirconia (NiO-YSZ). The anode/electrolyte bi-layer is sintered as a unit, followed by application of a thin cathode, usually 25-50 um thick, which is then fired at a lower temperature.

There are a number of problems for the ASC cell which include: 1) shrinkage matching of the thick NiO-YSZ cermet and the thin YSZ electrolyte, which has been a critical and challenging problem; 2) as the NiO in the anode is reduced to nickel metal there is a volume change that can generate stresses within the anode and cause fracture and failure of the thin YSZ electrolyte; 3) the anode is sensitive to leaks of oxygen which can cause oxidation of the Ni metal to Ni-oxide resulting in a sudden expansion of the anode and failure of the cell (as can happen at two critical times; first during operation of the cell, if there are pin-hole leaks in the electrolyte then air can leak through, leading to a localized chemical expansion as Ni-metal is oxidized, a crack starts to grow and then it causes failure of the cell, in hours or days—second, on cooling down the stack, the anode should be kept in a reducing environment so the Ni-metal does not oxidize, which is a challenge to developers where the fuel cell might be operating on reformed natural gas, jet fuel, gasoline, etc.; a reducing gas should be used to protect the fuel electrode as the stack is cooled; a brief mistake on cooling can cause the entire stack to fail all at once, resulting in the failure of hundreds of cells); 4) to provide enough strength, the rather weak Ni-YSZ ASC anodes must be made thick, which can lead to diffusion problems in the anode (which works against achieving high fuel utilization rates that are required for commercial applications); 5) the cells are fragile and can not tolerate the high compressive loading that is required for the compression type seals that are used with the ASC stacking technology (which has required some manufacturers to install additional metal sealing plates, called cassettes, which add to overall complexity and general materials challenges; 6) the anode, cathode, and electrolyte layers must be fired simultaneously up to 1,250 C so as to bond the cathode to the electrolyte, a temperature approximately 400 C higher than the fuel cell's operating temperature, which can result in significant chemical reactivity during fabrication, thus limiting potentially better performing cathode compositions.

PRIOR ART

U.S. 2001/0053471 to Gorte et al., disclose methods for generating electricity using a solid oxide fuel cell having an anode electrode of porous YSZ (see Abstract). More specifically, Gorte et al. teach a thin porous YSZ region on the anode (fuel) side of the cell only, deposited on a thick, presintered YSZ electrolyte (see col. 2, par. 0012). The thin porous region is fabricated using traditional ceramic processing techniques. Gorte, et al, also teach impregnation of the porous YSZ anode region with liquid-based precursors to form electrodes (see col. 2, par. 0012).

Fuel cell information disclosed by Eileen J. De Guire at http://www.csa.com/hottopics/fuecel/overview.php, included in its entirety herein by reference hereto. De Guire describes state of the art solid oxide fuel cells of the planar and tubular types, and she makes specific reference to a dipping method of applying a YSZ slurry that is then freeze dried to achieve porosity.

SUMMARY OF THE INVENTION

The invention is a symmetrical bi-electrode supported solid oxide fuel cell comprising a monolithic framework including a first porous electrode scaffold, a second porous electrode scaffold and a thin electrolyte layer that is monolithically disposed between the first and the second electrode scaffolds. The outermost exposed surfaces of each of the first and second porous electrode scaffolds each has a thin electrically conductive ceramic coating deposited on it having essentially the same coefficient of thermal expansion as the first and second porous electrode scaffolds and the thin electrolyte layer and both thin electrically conductive coatings are made of doped $LaCrO_3$ and each has a thickness in the range of about 2 um to about 200 um, and a preferred thickness in the range of about 5 um to about 25 um. Two opposing edges of the first porous electrode scaffold each has a ceramic sealant placed over it, and two opposing edges of the second porous electrode scaffold each has a ceramic sealant placed over it, and each ceramic sealant has essentially the same coefficient of thermal expansion as the first and second porous electrode scaffolds, the thin electrolyte layer and the thin electrically conductive ceramic coatings. The monolithic framework is sintered. The first porous electrode scaffold and the second porous electrode scaffold each has a thickness in the range of about 100 um to about 1,500 um, and a preferred thickness in the range about 300 um to about 750 um. The thin electrolyte layer are made of essentially one material, which is an ionic conductor of oxygen ions, and it is selected from the group of materials consisting essentially of doped oxides of zirconium, cerium, bismuth, hafnium, thorium, indium, and uranium, and further, ionic conductors selected from the group of materials consisting essentially of yttria stabilized zirconia, partially stabilized zirconia, scandia stabilized zirconia, gadolinium doped ceria samarium doped ceria and yttrium doped ceria, and a perovskite oxide conductor, strontium and magnesium-doped lanthanum gallate or $LaSrGaMgO_3$. The first porous electrode scaffold and the second porous electrode scaffold each comprises a plurality of graded pores, each having a small end and a large end, that are oriented more or less perpendicular to the thin electrolyte layer. The graded pores have characteristic small diametrical pore dimensions in the range of about 0.5 um to about 15 um, preferably with characteristic small diametrical pore dimensions in the range of about 2 um to about 10 um. The graded pores have characteristic large diametrical pore dimensions in the range of about 25 um to about 125 um, preferably with characteristic large dimensions in the range of about 50 um to about 100 um. The graded pores are oriented such that the small ends of the pores are adjacent the thin electrolyte layer and the large ends are distal from the thin electrolyte layer. The thin electrolyte layer has a thickness in the range of about 2 um to about 200 um, preferably with a thickness in the range of about 5 um to about 25 um.

The invention is also a method of making a symmetrical bi-electrode supported solid oxide fuel cell from a monolithic framework the steps of providing a first and a second piece of porous YSZ tape, each of which comprises a plurality of graded pores that are oriented more or less perpendicular to first and second opposing surfaces of each piece of YSZ tape wherein each of the graded pores has a small end and a large end, coating a thin layer of aqueous YSZ ink upon a surface of each of the first and the second pieces of graded pore YSZ tape having the small ends the graded pores, mating the coated surface of one of the first and the second pieces of graded pore YSZ tape with the coated surface of the other piece of tape, coating a thin aqueous layer of electrically conductive ceramic ink upon YSZ tape surfaces having the large ends of the graded pores, placing a first ceramic sealant over each of two opposing edges of the first piece of graded pore YSZ tape, placing a second ceramic sealant over each of two opposing edges of the second piece of graded pore YSZ tape and sintering the whole thing into a monolithic framework. Additional steps of the method include treating the first piece of sintered graded pore YSZ electrode scaffold with a metal solution and heat to impart catalytically active anodic properties, and treating the second piece of sintered graded pore YSZ electrode scaffold with a metal solution and heat to impart catalytically active cathodic properties. The method includes the additional steps of directionally freeze casting a more or less uniformly distributed aqueous slurry of ceramic YSZ material and polymeric compound upon an underlying film surface so that crystals of freezing solvent form a graded pore structure within the freeze casted YSZ tape, said graded pores being oriented more or less parallel to one another and perpendicular to the film surface, with the smaller pore openings being closest to the film surface, followed by immediate freeze drying of the freeze casted YSZ tape, with the underlying film attached, and then cutting the graded pore YSZ tape and the underlying film into two pieces of equal shape and area.

The invention is also a freeze casting system, comprising a support frame, a flat surface disposed upon the support frame comprising a casting bed portion and a freezing bed portion, with a thermally insulative material between the support frame and the casting bed portion and the freezing bed portion, and a means for holding a spool of film material that is moveable across the casting bed portion and the freezing bed portion, plus a means for distributing a ceramic slurry uniformly upon the moveable film. The film material that is moveable across the casting bed portion and the freezing bed portion is a selected from a group consisting essentially of polyester, thermoplastic and thermosetting plastic material. Said film material is moveable across the casting bed portion and the freezing bed portion at a constant speed. The freezing bed portion has a temperature of not greater than about $-50°$ C. The ceramic slurry is distributed in a thickness of between about 100 um and 1,500 um.

BRIEF SUMMARY OF THE FIGURES

The structure, operation, and advantages of the present invention will become apparent upon consideration of the description herein below taken in conjunction with the accompanying FIGURES. The FIGURES are intended to be illustrative, not limiting. Certain elements in some of the FIGURES may be omitted, or illustrated not-to-scale, for illustrative clarity. The cross-sectional views may be in the form of "slices," or "near-sighted" cross-sectional views, omitting certain background lines which would otherwise be visible in a "true" cross-sectional view, for illustrative clarity.

Although the invention is generally described in the context of these preferred embodiments, it should be understood that the FIGURES are not intended to limit the spirit and scope of the invention to these particular embodiments.

Certain elements in selected ones of the FIGURES may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the FIGURES can be numbered such that similar (including identical) elements may be referred to with similar numbers in a single FIGURE. For example, each of a plurality of elements collectively referred to as 199 may be referred to individually as 199*a*, 199*b*, 199*c*, etc. Or, related but modified elements may have the same number but are distinguished by primes. For example, 109, 109', and 109" are three different elements which are similar or related in some way, but have significant modifications, e.g., a tire 109 having a static imbalance versus a different tire 109' of the same design, but having a couple imbalance. Such relationships, if any, between similar elements in the same or different figures will become apparent throughout the specification, including, if applicable, in the claims and abstract.

The structure, operation, and advantages of the present preferred embodiment of the invention will become further apparent upon consideration of the following description taken in conjunction with the accompanying FIGURES, wherein.

DEFINITIONS

"Aqueous" refers to the liquid component, such as water or organic solvent, of a slurry material.

"Fuel cell" refers to a device comprising an electrolyte that is disposed between two electrodes, one of which reacts with a fuel, the other with an oxidizer "Fuel cell stack" refers to a stack of individual fuel cells that are electrically connected to one another in parallel or series to provide electric power at, respectively, low voltage or high voltage.

"Monolith" or "monolithic" refers to a unitary ceramic object comprised of sintered solid oxide material.

"Scaffold" a graded pore YSZ tape which, subsequent to sintering, is a porous ceramic that can be treated, with appropriate metal solutions and heat, to have imparted to it either anodic or cathodic catalytically active properties.

"Symmetrical" refers to the like thicknesses of the electrodes and the electrode scaffolds that support the thin intervening electrolyte layer.

DETAILED DESCRIPTION OF THE PREFERRED EMBODIMENT

The present invention addresses the aforementioned difficulties of solid oxide fuel cell (SOFC) fabrication and reliability and weight associated with the anode supported cell design (ASC) and the metal interconnects used to connect separate cells a fuel cell stack. More specifically, the present invention is a symmetrical, bi-electrode supported fuel cell (BSC), shown in the oblique schematic view in FIG. 1A, comprising a monolithic framework 10 including as main operational elements a first electrode scaffold 14, a second electrode scaffold 16, and a thin electrolyte layer 12 that is monolithically disposed between the first and the second electrode scaffolds. The thin electrolyte layer 12 has a thickness of between 2 um and 200 um, and most preferably between 5 um and 25 um. The two outermost exposed surfaces of the first electrode scaffold 14 and the second electrode scaffold 16 each also has a thin electrically conductive ceramic coating 19 deposited on it. The coatings 19 serve the function of interconnects to other cells in a stack of such cells. The first electrode scaffold 14 and the second electrode scaffold 16 each has essentially the same thickness as the other, and each has a thickness in the range of 100 um to 1500 um with a most desired range of 300 um to 750 um.

Figure 1A:
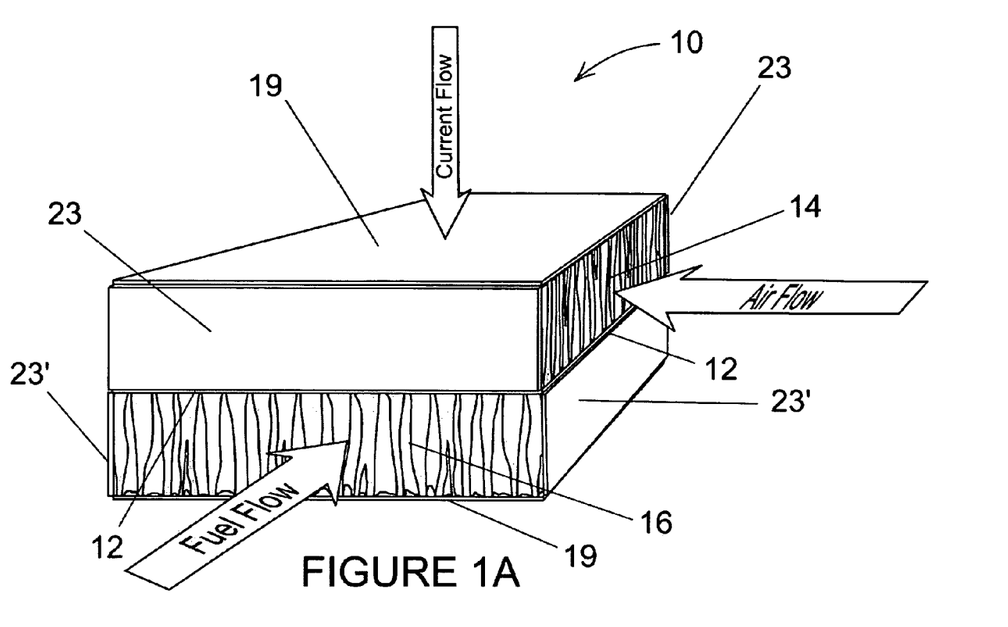
FIG. 1A is an oblique schematic view of a single symmetrical bi-electrode supported cell, according to the present invention, prior to or subsequent to sintering.

Still referring to FIG. 1A, note the ceramic sealant layers 23 and 23'. The set of ceramic sealant layers 23 cover two opposing edges 14',14" (FIG. 1B) of the first electrode scaffold 14, and two opposing edges 16',16" of the second electrode scaffold 16 each has a ceramic sealant 23' placed over it.

Figure 1B:
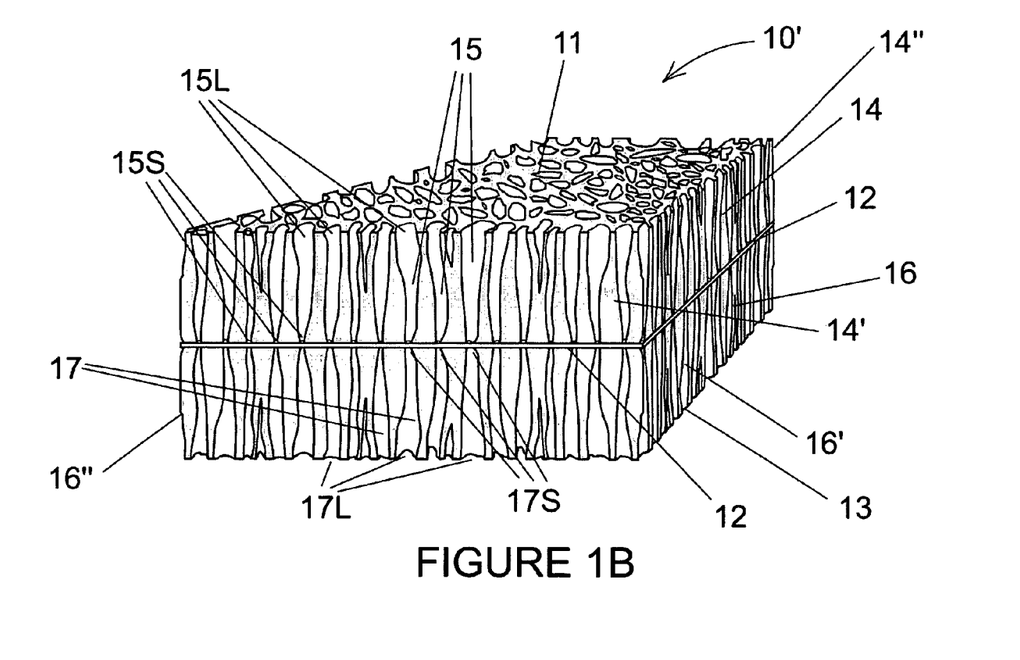
FIG. 1B is an oblique view of the electrode scaffolds and electrolyte layer of a single monolithic bi-electrode supported cell.

The main structural elements of the BSC, labeled as 10' are revealed in the oblique schematic view of FIG. 1B wherein the overall structure 10' comprises the main operational elements which are a non-porous electrolyte layer 12 that is disposed between a porous first electrode scaffold 14 and a porous second electrode scaffold 16. That is, the first electrode scaffold 14 and the second electrode scaffold 16 each comprises a plurality of graded pores 15,17 respectively, that are oriented more or less perpendicular to the thin electrolyte layer 12. The pores 15 of the first electrode scaffold 14, and the pores 17 of the second electrode scaffold 16 are graded in size such that the smallest ends 15S,17S of the sets of pores 15 and 17 are adjacent the electrolyte layer 12, and the largest ends 15L,17L are disposed most distal from the electrolyte layer.

The graded pores 15 of the first electrode scaffold 14, and the graded pores 17 of the second electrode scaffold, have characteristic small diametrical pore dimensions of between 0.5 um and 15 um, and most preferably of between 2 um and 10 um, and the characteristic large pore dimensions are between 25 um and 125 um, and most preferably of between 50 um and 100 um. The pore sets 15,17 within each electrode scaffold 14,16 are oriented more or less perpendicular to the thin electrolyte layer 12. The first electrode scaffold 14 and the second electrode scaffold 16, as well as the electrolyte layer 12, are made of essentially one material that is selected from a class of materials consisting essentially of ionic conductors. More generally, the one material is selected from general class of solid ceramic materials comprising ionic conductors of either protons or, preferably in relation to this present invention, oxygen ions. In the case of a protonic conductors the structure shown in FIG. 1B would be made of the general class of materials such as doped barium cerate ($BaCeO_3$) or doped strontium cerate ($SrCeO_3$), doped barium zirconate ($BaZrO_3$) or strontium zirconate ($SrZrO_3$) and mixtures of these. Cell development is not limited to these materials, as long as the materials are stable in both the reducing and oxidizing environments that the cell is exposed to during fabrication and use. In the case of oxygen ion conductors, many of which have the fluorite like crystal structure, the structure 10' is made of the general class of materials such as doped zirconia ($ZrO_2$), doped ceria ($CeO_2$) and other doped oxides of metals such as bismuth, hafnium, thorium, indium or uranium. More specifically, oxide ion conductors of materials such as yttria stabilized zirconia (YSZ or 8YSZ), partially stabilized zirconia such as 3YSZ, scandia stabilized zirconia (ScSZ), gadolinium doped ceria (GDC) or other commonly doped cerias such as samarium or yttrium (SDC or YDC), and a perovskite oxide conductor, strontium and magnesium-doped lanthanum gallate, referred to as LSGM ($LaSrGaMgO_3$).

The BSC 10 in FIG. 1A is a single monolithic ceramic framework wherein the electrode scaffolds 14,16, electrolyte layer 12, electrically conductive layers 19 and edge sealant sets 23,23' are made of ceramic materials that have essentially the same coefficients of thermal expansion. The structure 10' shown in FIG. 1B comprises the main active fuel cell components which are the two electrode scaffolds 14,16 and the thin electrolyte layer 12, all of which are made of essentially one material which, for simplicity in this disclosure, is the aforementioned YSZ. The use of materials having the same coefficient of thermal expansion serves to minimize interfacial stresses during high temperature processing such as sintering, as well as the potential for such stresses as might otherwise arise during use of the fuel cell.

Referring again to FIG. 1A, the symmetrical bi-electrode supported cell (BSC) 10 according to the present invention is shown with thin, electrically conductive ceramic interconnect layers 19, top and bottom, and edge seals 23,23' disposed respectively on opposing edges of the electrode scaffolds 14,16, so as to provide flow channels for fuel and air as indicated.

The electrode scaffolds 14,16 are more or less symmetrical, having essentially the same thickness, about the thin electrolyte layer 12 so that the two electrode scaffolds provide balanced stresses on each side of the thin electrolyte layer during both fabrication and use of the fuel cell or fuel cell stack.

The BSC 10 shown in FIG. 1A is, subsequent to sintering, a monolithic framework which, upon subsequent treatment of the electrode scaffolds 14,16 with metal salts and heat, as described hereinbelow, becomes a complete single symmetrical bi-electrode supported cell.

Referring yet again to FIG. 1B, the sets of graded pores 15,17 in the first and the second electrode scaffolds 14,16 have characteristic small diametrical pore dimensions of between 0.5 um and 15 um, and most preferably of between 2 um and 10 um, and the characteristic large pore dimensions are between 25 um and 125 um, and most preferably of between 50 um and 100 um.

Freeze Tape Casting and Freeze Drying

Referring now to the remaining FIGURES, the method of making the BSC 10 is given in detail, beginning with a modified, freeze-tape casting technology, which was the subject of an earlier in-house NASA invention disclosure, LEW #17628.

The freeze-tape casting technology has the purpose and function of producing the aforementioned graded pore size in the respective electrode portions of the YSZ monolith. In brief summary, the freeze-tape casting method begins with the traditional tape casting method wherein an aqueous ceramic slip material is cast onto a carrier film made of thermosetting plastic or thermoplastic or other suitable film material by means of a doctor blade apparatus. Directional freezing of the tape (or slip), which causes the formation of graded pores, is followed by freeze drying to produce unsintered or 'green' YSZ tape, having the desired graded porosity in which the side of the YSZ tape that is in contact with the film has smaller pores than those on the other side. A polymer is also incorporated into the slip so as to impart flexibility to the resultant cast tape after it is freeze dried. When the aqueous carrier solvent is water, a polymer such as acrylic latex emulsions or more traditional polyvinyl alcohol (PVA) or methocel are used. When the carrier solvent is organic (such as terpineol and/or tertiary butyl alcohol) are used, then the polymer might be polyvinyl butyral or ethyl cellulose.

Figure 2:
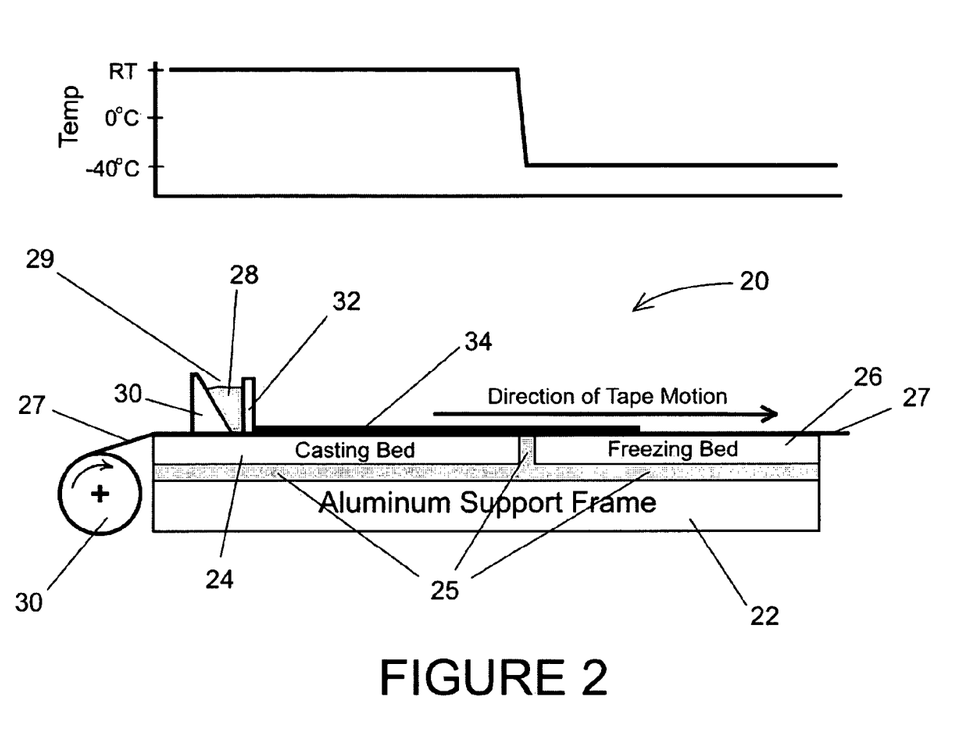
FIG. 2 is a schematic side view of a freeze-tape casting machine.

FIG. 2 is an orthogonal schematic side view of a freeze-tape casting system 20 consisting of an base support structure 22 disposed beneath a casting bed 24 and a freezing bed 26 across which film material 27 moves from a means 30 for holding a spool. The support frame 22, casting bed 24 and freezing bed 26 are separated from one another by thermally insulative material 25.

Slip material 28 (having either an aqueous or a non-aqueous liquid solvent) is held in reservoir 29 defined by dam 30 and doctor blade 32 which, together, comprise a means for distributing a ceramic slurry uniformly upon the moveable film 27. The YSZ particles in the aqueous slip 28 have a characteristic dimension range of between 0.25 um and 5 um and most preferably of between 0.5 um and 1.5 um. The slip formulation also includes, in the water-based system, an acrylic latex binder, which imparts flexibility to the resultant freeze-dried casting. The doctor blade 32 distributes the slip material 28 in a thin cast layer 34 upon the film 27 as it progresses (to the right in FIG. 2) across the casting bed 24, and thence across the freezing bed 26, whereupon the slip material freezes in a directional way (bottom to top) so as to cause the formation of ice (or other) crystals that give rise to the desired graded pore structure (not shown in FIG. 2) within the cast YSZ tape. The frozen crystals that give rise to the graded pores become larger as the vertical distance from the freeze bed 26 increases and as the crystal grows from the bottom, near the freeze bed, to the top of the tape. (The temperature diagram at the top of FIG. 2 shows the temperature of the film 27 and the overlying cast slip material 34 [which becomes the YSZ tape] in relation to location upon the freeze casting system 20.)

More specifically, it can be said that the freezing of the cast tape 34 is such as to cause the directional growth of water (and/or other solvent) crystals so as to form pores whose characteristic interstitial dimensions increase in rough proportion to the distance from the underlying film 27. This freeze-tape casting process has been developed as a method of forming and controlling complex pore structures without having to use thermally fugitive pore formers. It is ideally suited for fabrication of the symmetrical bi-electrode supported fuel cell wherein the resultant graded pores can be tailored in size and other structural characteristics for fuel and air diffusion within the two respective electrode scaffolds (14,16 in FIG. 1B) that ultimately become catalytically active electrodes, anode and cathode. Freeze casting provides a high degree of open porosity that is not easily achieved with traditional pore forming technologies.

Figure 3A:
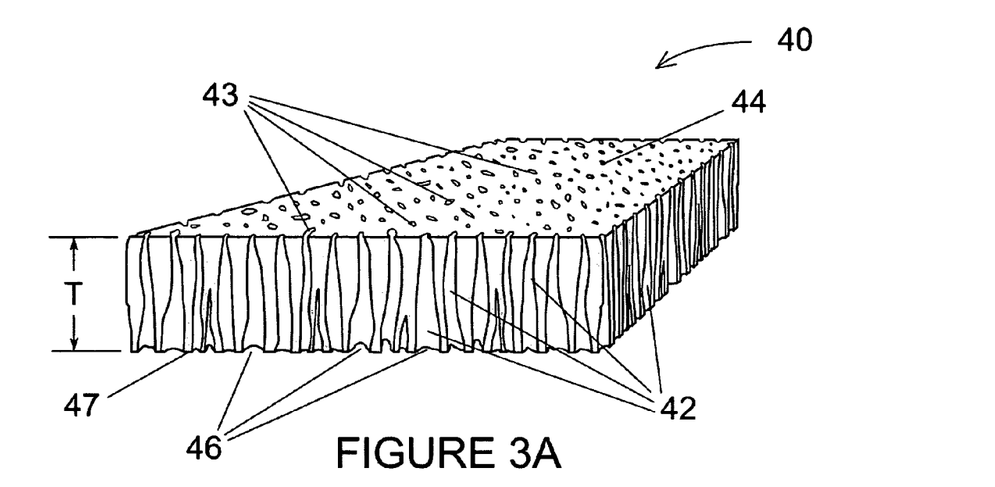
FIG. 3A is an oblique schematic view of a piece of cast YSZ tape having a graded pore structure.
Figure 3B:
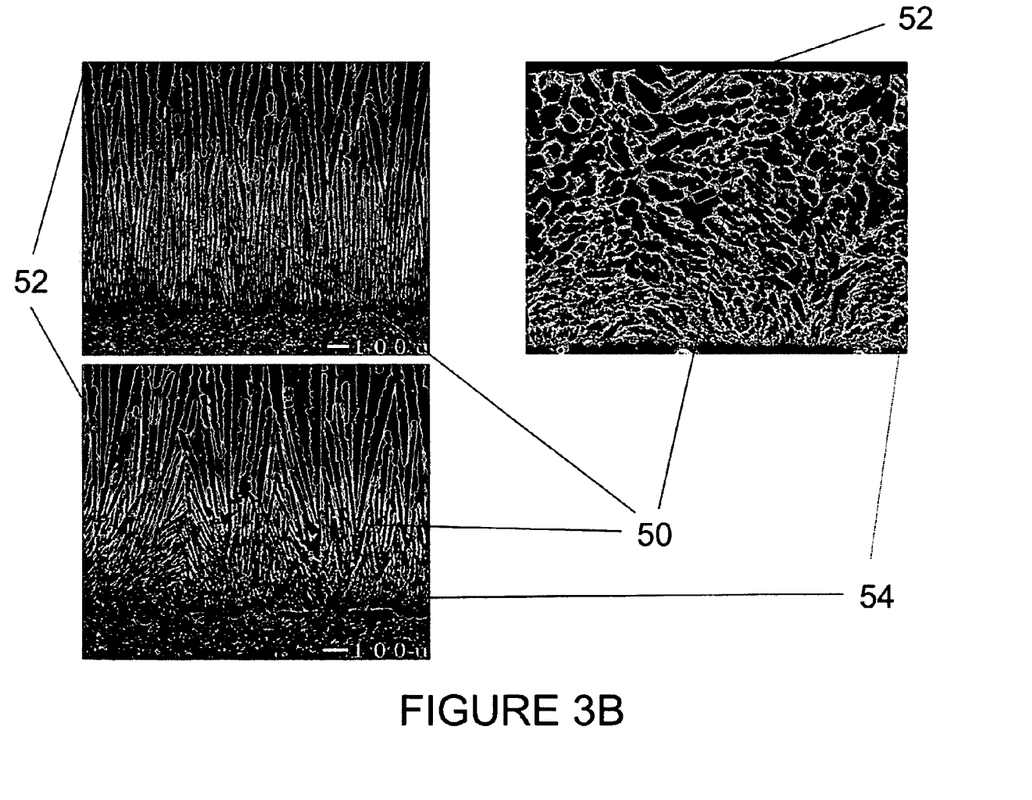
FIG. 3B contains three scanning electron micrographs (SEMS) of the edge of a piece of cast YSZ tape.

FIG. 3A is an oblique schematic view of a graded-pore portion of green YSZ tape 40. The thickness T of the green YSZ tape 40 is in the range of 100 um to 1500 um with a most desired range of 300 um to 750 um. Pores 42 extend through the thickness of the tape 40, with the gradation of the pores being evident in the small pore openings 43 on the top side 44, and the larger pore openings 46 (visible only at the bottom edge in FIG. 3A) being on the out-of-view bottom side 47. FIG. 3B presents scanning electron micrographic views of pieces of green tape 50 with the pores ranging in characteristic dimension, in these views, from 40 to 50 um on one side 52, down to 4 to 7 um on the other side 54.

Though the freeze-casting portion of this symmetrical, monolithic BSC invention is described thus far in specific relation to the freeze casting method of creating graded pore YSZ tape, it is well within the spirit and scope of this present disclosure to assert that the use of this freeze cast method is not meant here to be limited to slip compounds consisting only of YSZ or to combinations of YSZ and other materials such as the aforementioned general class of materials comprising ionic conductors, either protonic or oxygen and preferably the oxygen ion. In one embodiment the tape 40 shown in FIG. 3A might be slightly altered to facilitate impregnation and bonding of the impregnated catalytically active electrode materials and might be made slightly porous to roughen the surface, doped-$CeO_2$ might be added to the YSZ to lower interfacial resistance or a small amount of NiO might be incorporated to improve bonding of the Ni anode. In the case of a protonic conductor the structure 10' (FIG. 1B) would be made of the general class of materials such as doped barium cerate ($BaCeO_3$) or doped strontium cerate ($SrCeO_3$), doped barium zirconate ($BaZrO_3$) or strontium zirconate ($SrZrO_3$) and mixtures of these, and not limited to these materials, as long as the materials are stable in both the reducing and oxidizing environments that the cell is exposed to. In the case of oxygen ion conductors, many of which have the fluorite crystal structure, the structure 10' is made of the general class of materials such as doped zirconia ($ZrO_2$), doped ceria ($CeO_2$) and other doped oxides of metals such as bismuth, hafnium, thorium, indium or uranium. More specifically, oxide ion conductors of materials such as yttria stabilized zirconia (YSZ or 8YSZ), partially stabilized zirconia such as 3YSZ, scandia stabilized zirconia (SSZ), gadolinium doped ceria (GDC) or other commonly doped cerias such as samarium or yttrium (SDC or YDC), and a perovskite oxide conductor, strontium and magnesium-doped lanthanum gallate or LSGM ($LaSrGaMgO_3$). The preferred material for 10' in the remaining description of the present invention is YSZ.

Referring again to FIG. 2, the frozen slip 34 (which is also called 'tape,' 'green tape,' or 'unsintered tape'), while still attached to the backing film 27, is quickly removed to a freeze drying chamber where a vacuum causes the ice crystals to evaporate (sublime) so as to leave the graded pores. The attached film 27 makes the tape 34 easier to handle during and after the freeze drying process. The backing film 27 is usually left attached to the tape 34 until after the tape is cut to size; it is usually not removed until immediately prior to the application of a thin layer of YSZ ink, as described below to form the thin electrolyte layer 12 shown in FIGS. 1A and 1B. The fragile tape has a "memory," meaning that if it gets bent or flexed too far, it will become distorted in a way that will cause flaws in the final sintered part.

The graded porosity of the YSZ tape 34 (FIG. 2) after it is frozen and freeze dried is such that the finest pores (43 in FIG. 3A) are located on that portion of the tape's surface (44 in FIG. 3A) that had been in contact with the support film 27 during the freezing process. That is, during the freezing process, the crystals grow in characteristic dimension as the freezing progresses upward from the support film 27 in contact with the freezing bed 26 as shown in FIG. 2.

The process of making symmetrical bi-electrode supported solid oxide fuel cells 10,10', as illustrated in FIGS. 1A and 1B, includes a high temperature sintering step that is described below, which is followed by the process steps of converting each of the electrode scaffolds 14,16 into active electrodes by imparting catalytic activity to them by solution and thermal treatment means which include separate steps for the anode and the cathode, as described in detail hereinbelow.

Fabrication of Symmetrical BSC Cells

The following method is used to fabricate a single, monolithic, symmetrical, solid-state, bi-electrode supported fuel cell comprising a cathode, an anode and an intervening region of solid electrolyte.

Figure 4A:
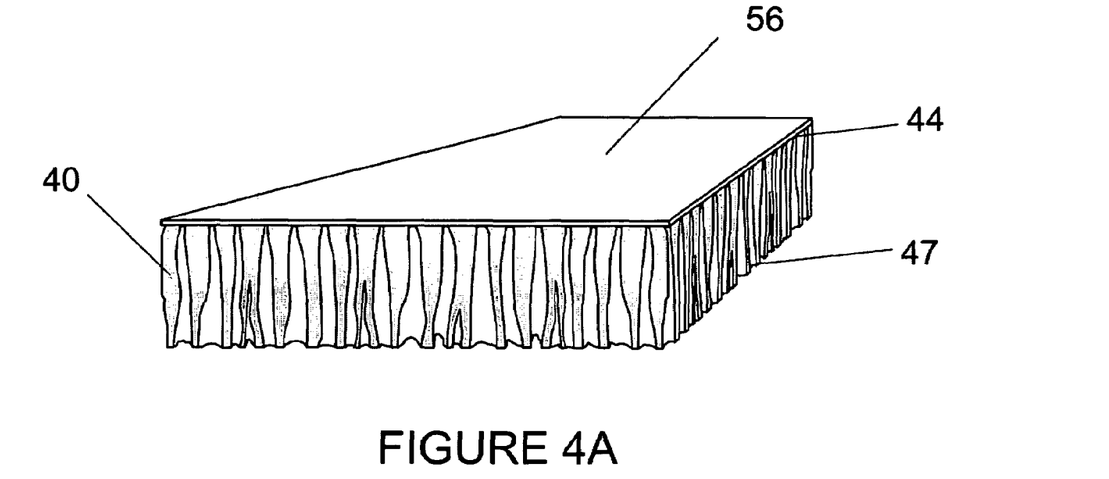
FIG. 4A is an oblique schematic view of a freeze dried and freeze casted piece of YSZ tape with a thin YSZ electrolyte ink layer on its small pore surface.

After freeze drying of the YSZ tape portions (40 in FIG. 3A), the backing film 27 (FIG. 2) is removed from each of two pieces of tape 34 that is to be used in the fabrication of a fuel cell. Referring now to FIG. 4A, the piece of green YSZ tape 40 shown in FIG. 3A is shown again in oblique schematic view, but with a thin layer 56 of YSZ ink that has been screen printed or air brushed/sprayed-on on the side 44 having the smaller pore openings (which are out of view beneath the coating 56). The YSZ coating 56 is between 20 and 40 um thick in the 'green' state, which results in, after sintering as described below, an electrolyte layer having a total thickness of between 15 um and 20 um. The YSZ ink formulation also includes an ethyl cellulose binder when the terpineol/xylene type solvents are used, so as to impart flexibility prior to sintering.

Figure 4B:
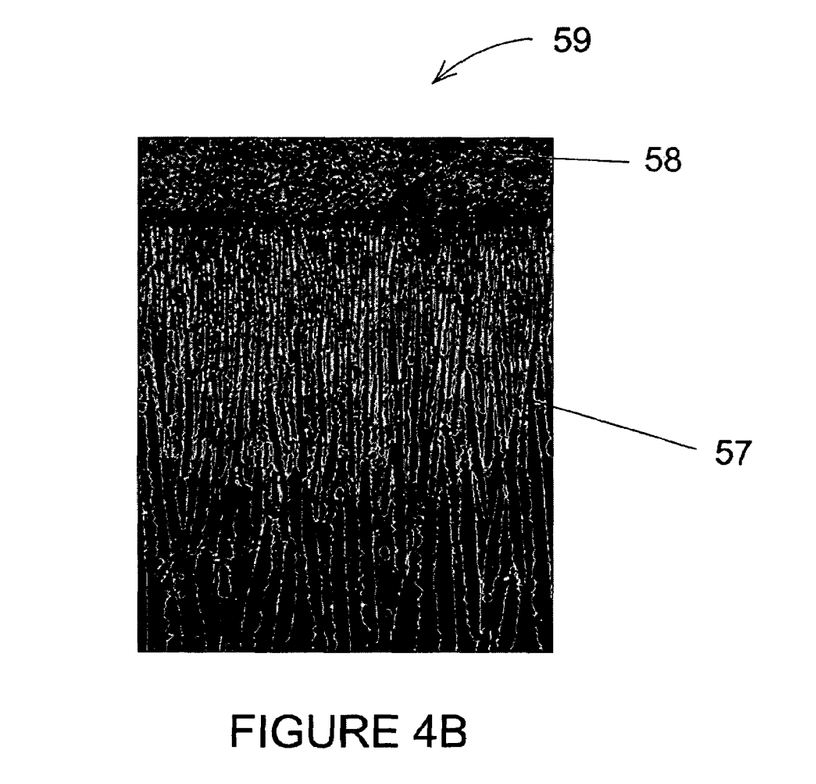
FIG. 4B is a SEM image of the edge of a piece of freeze dried YSZ tape with a thin YSZ electrolyte layer on it.

FIG. 4B is a scanning electron micrograph of an actual YSZ tape 57 with a thin YSZ coating 58 that, upon completion of sintering, becomes part of an integral electrolyte layer 58.

Figure 5:
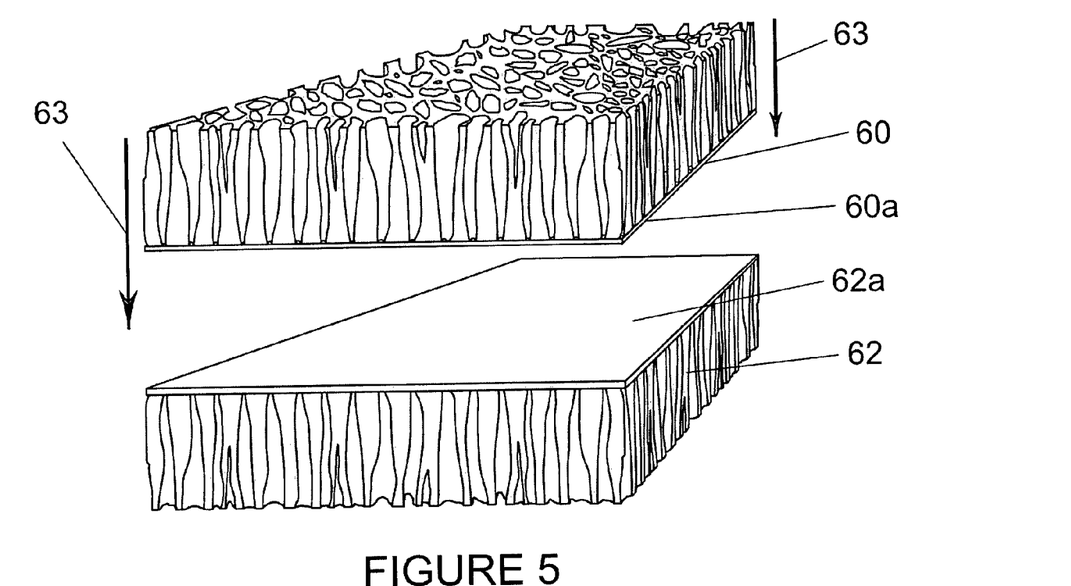
FIG. 5 is an oblique view of two pieces of graded pore YSZ tape, with small pore surfaces coated, being brought together.

Referring now to FIG. 5, there are shown in oblique schematic view two pieces of tape 60,62, each of which is likewise coated (as with tape 40 in FIG. 4A) with a thin layer 60a,62a of uniformly applied YSZ ink. The YSZ ink also contains a polymeric compound to impart flexibility to the pieces of tape prior to sintering; in the water based system an acrylic latex binder is used, and in the terpineol/xylene system and ethyl cellulose binder is used.

The two pieces of green YSZ tape 60,62, having respective YSZ coatings 60a,62a, are brought together, or mated, as indicated by the arrows 63 so that the respective coated surfaces make intimate contact. Slight pressure might be applied to remove intervening bubbles. The respective coatings 60a, 62a will, during and subsequent to sintering, become merged into a single, thin, nonporous electrolyte region disposed between two YSZ electrode scaffolds 60,62 having graded porosity within a single, monolithic YSZ structure 64 as shown in the oblique schematic view of FIG. 6.

Figure 6:
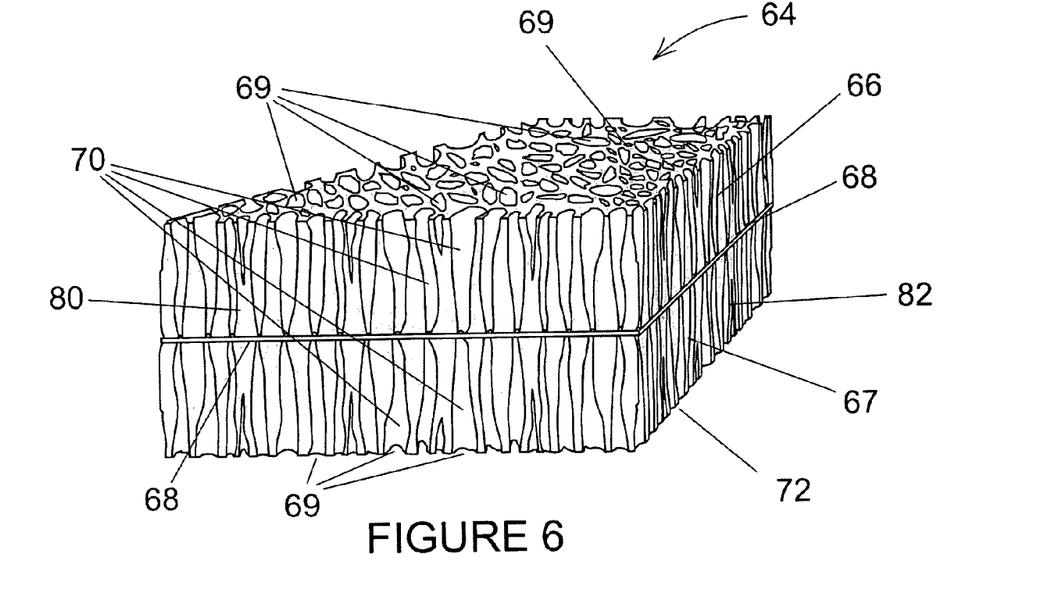
FIG. 6 is an oblique view of a single monolithic bi-electrode supported cell prior to or subsequent to sintering.

The structure 64 shown in FIG. 6 consists of two graded-pore electrode scaffolds 66,67 joined at the thin, integral electrolyte layer 68. FIG. 6 is an oblique schematic portrayal of the appearance of the main structural components of the symmetric BSC according to the present invention. Note in FIG. 6 that the large pores 69 are most distal from the electrolyte layer 68. The sintering process, which takes place upon completion of the assembly of the cell components shown in FIGS. 1A and 1B causes the component YSZ particles of the structure 64 to become fused into a single YSZ piece that is an integral, unified piece of ceramic that is solid except for the intended pores. Polymeric components that had been part of the aqueous YSZ slip and ink formulations get burned away during sintering.

The inventors have experimented with a number of cell fabrication methods or sequences. For instance, the two pieces of unsintered YSZ tape 60,62 in FIG. 5 can be placed together while the ink of the layers 60a,62a is not completely dry. As should be apparent to those skilled in the art, it is desirable that no bubbles or gaps exist between the two mated parts 60,62.

Figure 7:
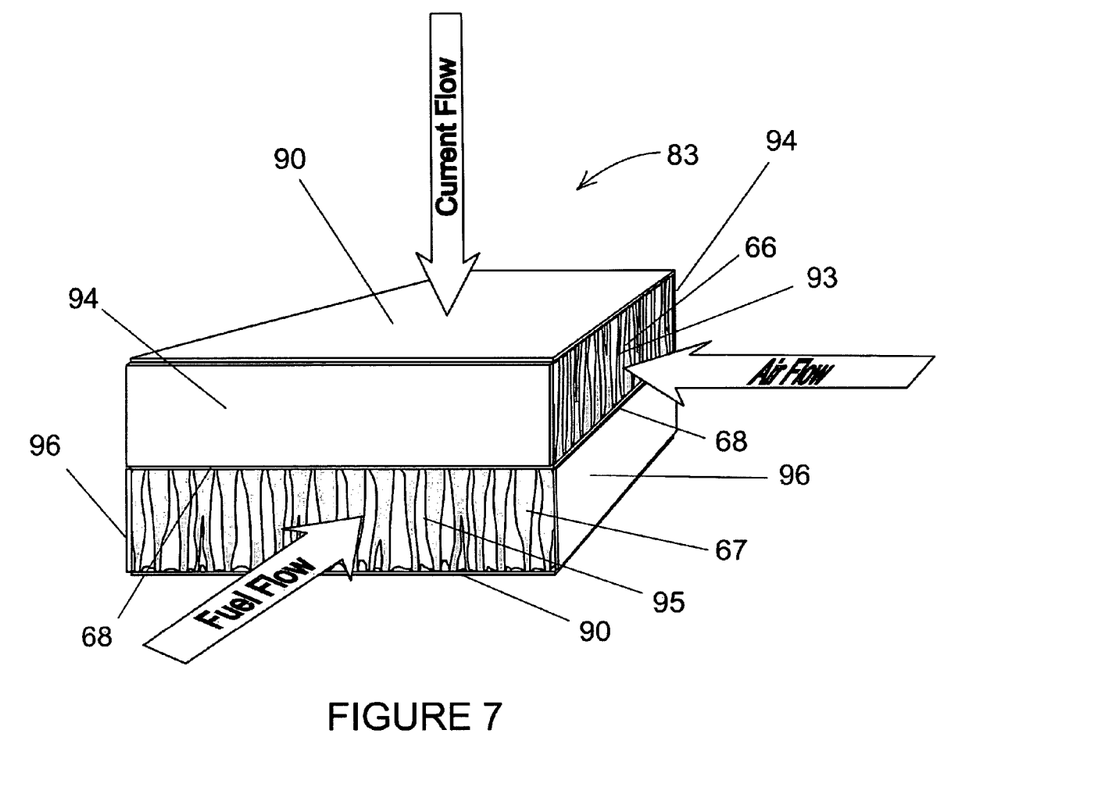
FIG. 7 is an oblique schematic view of a single symmetrical bi-electrode supported fuel cell.

Prior to sintering of 64 in FIG. 6, the creation of a symmetrical bi-electrode supported solid oxide fuel cell requires the additional steps of depositing upon the two outermost exposed surfaces 69 (i.e., the surfaces having the course pores) of each of the first and second electrode scaffolds 66,67 a thin coating 90 of electrically conductive ceramic, shown in FIG. 7. Subsequent to the sintering process, the coatings 90 become thin layers of electrically conductive ceramic which serve as electrical interconnects with adjacent cells (which are not shown in any of the FIGURES). The coatings 90 are made of such materials as doped-$LaCrO_3$. Creation of the layers 90 involves deposition of a slurry or ink compound of the desired ceramic material with a polymeric compound that gets burned off during sintering, providing electrically conductive interconnect layers 90 that have a coefficient of thermal expansion that is essentially the same as that of the other materials in the present symmetric BSC invention. The thickness of the final interconnect layers 90 is in the range of 2 um to 200 um, and most preferably in the range of 5 um to 25 um. Common dopants are Ca, Sr, Y, Co, Mg, Al, but not limited to these.

FIG. 7 also shows opposing edges (shown as 80 and 82 in FIG. 6, and their respective opposing edges, which are out of view) of each of the porous electrode scaffolds to be coated with, or impregnated with, ceramic sealant layers 94,96 so as to provide dense, hermetic seals for the creation of flow channels for fuel and air (as indicated in FIG. 7) through the respective porous electrode scaffolds 66,67, which, subsequent to sintering are treated by solution and thermal treatment means with appropriate solutions of metal salts, as described hereinbelow, so as to impart anodic and cathodic catalytic activity to the respective electrode scaffolds.

The ceramic sealant layers 94,96 are made of a glass or ceramic that is not electrically conductive and which has a coefficient of thermal expansion that is essentially the same as that of the YSZ or other material used in the creation of the electrode scaffolds, electrolyte layer 68 and, in the cast of a stack of cells, layers, the thin interconnect layers 90.

The entire structure 83 (FIG. 7) is then dried, or at least substantially dried, before being placed in a sintering furnace where it is gradually heated to 1350 to 1400° C. for several hours.

In some cases, particularly for larger area cells with higher gas flow rates, it may be desirable to create additional channels to reduce back pressure. The channels would be created in the direction of the gas flow and could be created by screen printing rows of thermally fugitive materials such as carbon on the surface of tape 66 & 67 in FIG. 6. The interconnect layer 90 (FIG. 7) would be coated over the fugitive materials and once the repeat unit was sintered, the carbon layers would decompose leaving behind micro gas channels.

Creation of Anode and Cathode from Electrode Scaffolds

Subsequent to sintering and cooling of the monolithic framework 83 in FIG. 7, the respective electrode scaffolds 66,67 are treated by solution and thermal means to impart anodic and cathodic catalytic properties to the respective electrode scaffolds. Said means involves the capillary uptake of metal salt solutions or sols that will become metal or metal oxide catalysts for the operation of the anode and cathode in the completed cell, and thermal treatment, as needed, to cause chemical reduction of catalytically active metals or metal compounds.

The solution treatment means involves the blocking of one electrode scaffold while the other is treated. More specifically, each end of one of the flow channels 93 or 95 in the respective electrode scaffolds 66,67 is masked off to plug the flow channels with a suitable polymer such as polypropylene carbonate dissolved in acetone, while the other electrode scaffold is infiltrated with a suitable metal salt. I.e., the cathode flow channel 93 is masked off while the anode electrode scaffold 67 is infiltrated with nickel salts and then allowed to become dry at low temperature before being heat treated at 800 C to decompose the Ni-salt to NiO which, in subsequent processing, or cell testing is reduced to nickel metal. Then the anode flow channel 95 is masked off while the cathode electrode scaffold 66 is infiltrated with active cathode materials, such as Sr-doped $LaMnO_3$ or, more generally, with a mixture of salts of La, Sr, and Mn to create a cathode, which is allowed to dry before being heated to 800 C in air to form the active air electrode (i.e., cathode), i.e., a perovskite having a general composition of $ABO_3$ wherein A=Sr, La, Ca, Ba and B=Co, Fe, Mn, Ni, Cu, Cr, Ga, Mg.

The inventors envision the present invention (the central portions of which are shown schematically as 10 in FIG. 1A and as 83, with channels 93,95 and interconnect layers 90, in FIG. 7) to be usable, and to be used, prior to sintering, as a repeat unit within a plurality of like unsintered fuel cell repeat units comprising electrode scaffolds (shown as 14,16 in FIG. 1 and as 66,67 in FIG. 6), electrolyte layers (shown as 12 in FIG. 1 and as 68 in FIG. 6), and interconnect layers (90 in FIG. 7) as components of, subsequent to sintering, of a monolithic solid-oxide fuel cell stack framework. Said monolithic fuel cell stack framework, subsequent to sintering and to the solution and thermal treatment means of the sort described hereinabove to confer suitable anodic and cathodic properties upon said electrode scaffolds, becomes a complete monolithic solid-oxide fuel cell stack.

DISCUSSION OF PRIOR ART

The disclosure of Gorte, et al., U.S. 2001/0053471, teaches a thin porous YSZ region on the anode (fuel) side of the cell only, deposited on a thick, presintered YSZ electrolyte (see col. 2, par. 0012). The thin porous region is fabricated using traditional ceramic processing techniques, it does not have graded porosity, and it does not provide support for the cell. In contrast, the present invention does not use the electrolyte as the support; rather, the thin electrolyte is balanced on both sides by porous YSZ electrode scaffolds that have graded porosity created by the freeze-casting technique, and the electrode scaffolds are the supports for the cell. Gorte, et al., also teach impregnation of the porous YSZ anode region with liquid-based precursors to form electrodes (see col. 2, par. 0012). However, while the present invention also teaches a technique involving liquid-based impregnation of the active electrode materials, it also makes use of said technique for both the anode and the cathode. The present invention also differs significantly in the method of fabrication of the final symmetrical BSC.

As for the article by Eileen J. De Guire on the Internet at http://www.csa.com/hottopics/fuecel/overview.php, De Guire describes state of the art solid oxide fuel cells of the planar and tubular types, and she makes specific reference to a dipping method of applying a YSZ slurry that is then freeze dried to achieve porosity which is not specified as being graded. Nor does the article by De Guire describe a monolithic single-material framework as the basis of a bi-electrode supported cell.

In an article by Moon, et al., Materials Letter 57 (2003) 1428-1434, the authors describe a anode supported tubular design in which the NiO-YSZ tube is fabricated by freeze casting and then a thin YSZ electrolyte is deposited by a slurry coating process. The Moon design differs substantially in that the cell is not symmetrical having graded porosity only in the anode. Further the process is used to describe the fabrication of a tubular cell as opposed to planar technology. Additionally, the freeze cast structures are prepared from NiO-YSZ and does not involve the infiltration of an active electrocatalyst. A complete cell based on Moon's technology has not been currently fabricated or tested.

Although the present invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claim is:

1. A symmetrical bi-electrode supported solid oxide fuel cell comprising:
    a monolith consisting of a sintered solid oxide material framework including:
        a first porous electrode scaffold having a plurality of graded pores;
        a second porous electrode scaffold having a plurality of graded pores; and
        a thin electrolyte layer that is monolithically disposed between the first and the second electrode scaffolds;
    an active anode material bonded within the plurality of graded pores of the first porous electrode scaffold; and
    an active cathode material bonded within the plurality of graded pores of the second porous electrode scaffold.

2. The symmetrical bi-electrode supported solid oxide fuel cell of claim 1 wherein the two outermost exposed surfaces of each of the first and second porous electrode scaffolds each has a thin electrically conductive ceramic coating deposited on it.

3. The symmetrical bi-electrode supported solid oxide fuel cell of claim 2 wherein the thin electrically conductive electrical coating deposited on the outer surface of each of the first and second porous electrode scaffolds has essentially the same coefficient of thermal expansion as the first and second porous electrode scaffolds and the thin electrolyte layer.

4. The symmetrical bi-electrode supported solid oxide fuel cell of claim 2 wherein the thin electrically conductive coating deposited on the outer surface of each of the first and second porous electrode scaffolds is made of doped $LaCrO_3$.

5. The symmetrical bi-electrode supported solid oxide fuel cell of claim 2 wherein the thin electrically conductive coating deposited on the outer surface of each of the first and second porous electrode scaffolds has a thickness in the range of about 2 um to about 200 um.

6. The symmetrical bi-electrode supported solid oxide fuel cell of claim 5 wherein the thin electrically conductive coating deposited on the outer surface of each of the first and second porous electrode scaffolds has a preferred thickness in the range of about 5 um to about 25 um.

7. The symmetrical bi-electrode supported solid oxide fuel cell of claim 2 wherein two opposing edges of the first porous electrode scaffold each has a ceramic sealant placed over it, and two opposing edges of the second porous electrode scaffold each has a ceramic sealant placed over it.

8. The symmetrical bi-electrode supported solid oxide fuel cell of claim 7 wherein each ceramic sealant has essentially the same coefficient of thermal expansion as the first and second porous electrode scaffolds, the thin electrolyte layer and the thin electrically conductive ceramic coatings.

9. The symmetrical bi-electrode supported solid oxide fuel cell of claim 1 wherein the first porous electrode scaffold and the second porous electrode scaffold each has a thickness in the range of about 100 um to about 1,500 um.

10. The symmetrical bi-electrode supported solid oxide fuel cell of claim 9 wherein the first porous electrode scaffold and the second porous electrode scaffold each has a preferred thickness in the range about 300 um to about 750 um.

11. The symmetrical bi-electrode supported solid oxide fuel cell of claim 1 wherein the essentially one material is an ionic conductor.

12. The symmetrical bi-electrode supported solid oxide fuel cell of claim 11 wherein the ionic conductor of oxygen ions is selected from the group of materials consisting essentially of doped oxides of zirconium, cerium, bismuth, hafnium, thorium, indium, and uranium, and further, ionic conductors selected from the group of materials consisting essentially of yttria stabilized zirconia, partially stabilized zirconia, scandia stabilized zirconia, gadolinium doped ceria samarium doped ceria and yttrium doped ceria, and a perovskite oxide conductor, strontium and magnesium-doped lanthanum gallate or $LasrGaMgO_3$.

13. The symmetrical bi-electrode supported solid oxide fuel cell of claim 1 wherein the first porous electrode scaffold and the second porous electrode scaffold each comprises a plurality of graded pores, each having a small end and a large end, that are oriented more or less perpendicular to the thin electrolyte layer;
    the small end having a small diametrical pore dimensions; and
    the large end having a large diametrical pore dimensions.

14. The symmetrical bi-electrode supported solid oxide fuel cell of claim 13 wherein the graded pores of the first porous electrode scaffold and the second porous electrode scaffold have characteristic small diametrical pore dimensions in the range of about 0.5 um to about 15 um.

15. The symmetrical bi-electrode supported solid oxide fuel cell of claim 13 wherein the graded pores of the first porous electrode scaffold and the second porous electrode scaffold have preferred characteristic small diametrical pore dimensions in the range of about 2 um to about 10 um.

16. The symmetrical bi-electrode supported solid oxide fuel cell of claim 13 wherein the graded pores of the first porous electrode scaffold and the second porous electrode scaffold have characteristic large diametrical pore dimensions in the range of about 25 um to about 125 um.

17. The symmetrical bi-electrode supported solid oxide fuel cell of claim 13 wherein the graded pores of the first porous electrode scaffold and the second porous electrode scaffold have preferred characteristic large diameterical pore dimensions in the range of about 50 um to about 100 um.

18. The symmetrical bi-electrode supported solid oxide fuel cell of claim 13 wherein the graded pores of the first porous electrode scaffold and the second electrode are oriented such that the small ends of the pores are adjacent the thin electrolyte layer and the large ends are distal from the thin electrolyte layer.

19. The symmetrical bi-electrode supported solid oxide fuel cell of claim 1 wherein the thin electrolyte layer has a thickness in the range of about 2 um to about 200 um.

20. The symmetrical bi-electrode supported solid oxide fuel cell of claim 19 wherein the thin electrolyte layer has a preferred thickness in the range of about 5 um to about 25 um.

21. The symmetrical bi-electrode supported solid oxide fuel cell of claim 1 wherein:

the active anode material within the first porous electrode scaffold and the active cathode material within the second porous electrode scaffold is selected from the group of materials consisting of metals and metal oxides.

* * * * *